US012795247B2

(12) United States Patent
Wang et al.

(10) Patent No.: US 12,795,247 B2
(45) Date of Patent: Nov. 10, 2026

(54) LINE SCAN IMAGING DEVICE, CALIBRATION METHOD AND CONTROL BOARD FOR IMAGE STITCHING

(71) Applicant: Diodes Incorporated, Plano, TX (US)

(72) Inventors: Wei Jen Wang, New Taipei City (TW); Tzu Ruei Lu, New Taipei City (TW); Te Wei Kuo, New Taipei City (TW)

(73) Assignee: Diodes Incorporated, Plano, TX (US)

( * ) Notice: Subject to any disclaimer, the term of this patent is extended or adjusted under 35 U.S.C. 154(b) by 170 days.

(21) Appl. No.: 18/896,550

(22) Filed: Sep. 25, 2024

(65) Prior Publication Data

US 2026/0006341 A1 Jan. 1, 2026

(30) Foreign Application Priority Data

Jun. 28, 2024 (CN) ......................... 202410852197.5

(51) Int. Cl.

*H04N 23/76* (2023.01)
*H04N 23/56* (2023.01)
*H04N 23/74* (2023.01)
*H04N 25/701* (2023.01)

(52) U.S. Cl.

CPC ............. *H04N 23/76* (2023.01); *H04N 23/56* (2023.01); *H04N 23/74* (2023.01); *H04N 25/701* (2023.01)

(58) Field of Classification Search

CPC ...... H04N 17/002; H04N 23/56; H04N 23/74; H04N 23/76; H04N 25/701

See application file for complete search history.

(56) References Cited

U.S. PATENT DOCUMENTS

2022/0397457 A1* 12/2022 Kim ...................... G01J 3/2823

* cited by examiner

*Primary Examiner* — Antoinette T Spinks
(74) *Attorney, Agent, or Firm* — AP3 Law Firm PLLC

(57) ABSTRACT

A calibration method for a line scan imaging device includes: obtaining a maximum pixel brightness value from first images, wherein the first images are generated by line scan camera modules with a light source turned on, and stitched along a scan line extension direction, and the line scan camera modules are arranged along the scan line extension direction; obtaining second images generated by the line scan camera modules with the light source operating at a predetermined light intensity, wherein a light intensity provided by the light source when the maximum pixel brightness value is less than or equal to a predetermined brightness value serves as the predetermined light intensity; obtaining third images generated by the line scan camera modules with the light source turned off; and generating calibration information based on the second images and the third images.

20 Claims, 14 Drawing Sheets

| | Min. grayscale value | Max. grayscale value | Ave. grayscale value | Standard Deviation |
|---|---|---|---|---|
| Image IMG1 (Line scan camera module 110) | 155 | 250 | 215.93 | 13.67 |
| Image IMG2 (Line scan camera module 120) | 32 | 166 | 133.71 | 16.20 |
| Image IMG3 (Line scan camera module 130) | 55 | 216 | 195.41 | 13.98 |

| | Min. grayscale value | Max. grayscale value | Ave. grayscale value | Standard Deviation |
|---|---|---|---|---|
| Image IMC1 (Line scan camera module 110) | 237 | 255 | 252.94 | 2.03 |
| Image IMC2 (Line scan camera module 120) | 228 | 255 | 251.30 | 2.49 |
| Image IMC3 (Line scan camera module 130) | 231 | 255 | 251.24 | 2.38 |

LINE SCAN IMAGING DEVICE, CALIBRATION METHOD AND CONTROL BOARD FOR IMAGE STITCHING

CROSS-REFERENCE TO RELATED APPLICATIONS

This application claims priority to Chinese patent application No. 202410852197.5, filed on 28 Jun. 2024 and entitled “Line scan imaging device, and calibration method and control board of line scan imaging device,” which is hereby incorporated by reference herein as if reproduced in its entirety.

TECHNICAL FIELD

The present application relates generally to line scan imaging, and in particular embodiments, to a line scan imaging device, a calibration method for a line scan imaging device, and a control board of a line scan imaging device.

BACKGROUND

Line scan cameras (or line array cameras) are widely used in industrial applications for providing high-speed imaging, continuous imaging, and high resolution. For example, on a production line of silicon wafers or printed circuit boards, line scan cameras can be used to capture images quickly and continuously, and analysis may be made for defects on the silicon wafers or printed circuit boards through high-resolution imaging, thereby achieving high-efficiency and high-precision inspection. Compared with area scan cameras (or area array cameras) that capture an entire frame at once, line scan cameras can reduce motion blur when detecting high-speed moving objects and have higher flexibility in inspection applications.

SUMMARY

Embodiments of the present application disclose a line scan imaging device, a calibration method for a line scan imaging device, and a control board for a line scan imaging device.

Certain embodiments of the present application include a calibration method for a line scan imaging device. The calibration method includes: obtaining the maximum pixel brightness value in a plurality of first images respectively generated by a plurality of line scan camera modules of the line scan imaging device when a light source is turned on, wherein the plurality of line scan camera modules are arranged along a scan line extension direction, and the plurality of first images are stitched in the can line extension direction; obtaining a plurality of second images generated by the plurality of line scan camera modules when the light source operates at a predetermined light intensity, wherein a light intensity provided by the light source when the maximum pixel brightness value is less than or equal to a first predetermined brightness value is used as the predetermined light intensity, and each pixel brightness value in the second image of each line scan camera module is less than or equal to the first predetermined brightness value; obtaining a plurality of third images generated by the plurality of line scan camera modules when the light source is turned off; and generating calibration information based on the plurality of second images and the plurality of third images.

Certain embodiments of the present application include a control board for a line scan imaging device. The control board includes a processing circuit and a memory. The memory is used to store a plurality of instructions. When the processing circuit executes the plurality of instructions, the plurality of instructions cause the processing circuit to perform the following steps: obtaining the maximum pixel brightness value in a plurality of first images respectively generated by a plurality of line scan camera modules of the line scan imaging device when a light source is activated, wherein the plurality of line scan camera modules are arranged along a scan line extension direction, and the plurality of first images are stitched in the scan line extension direction; obtaining a plurality of second images generated by the plurality of line scan camera modules when the light source operates at a predetermined light intensity, wherein a light intensity provided by the light source when the maximum pixel brightness value is less than or equal to the first predetermined brightness value is used as the predetermined light intensity; each pixel brightness value in the second image of each line scan camera module is less than or equal to the first predetermined brightness value; obtaining a plurality of third images generated by the plurality of line scan camera modules when the light source is turned off; and generating calibration information according to the plurality of second images and the plurality of third images.

Certain embodiments of the present application include a line scan imaging device. The line scan imaging device includes a plurality of line scan camera modules and a control board. Each line scan camera module includes a lens and a corresponding image sensor. The plurality of lenses of the plurality of line scan camera modules are arranged along a scan line extension direction. The plurality of image sensors of the plurality of line scan camera modules are used to respectively generate a plurality of first images when a light source is activated. The plurality of first images are stitched along the scan line extension direction. The control board is used to control operation of the plurality of image sensors. The control board includes a plurality of analog front-end circuits and a processing circuit. The plurality of analog front-end circuits are respectively coupled to the plurality of image sensors to receive the plurality of first images to respectively generate a plurality of sets of first data. The processing circuit is coupled to the plurality of analog front-end circuits to obtain the maximum pixel brightness value in the plurality of first images according to the sets of first data. The light intensity provided by the light source when the maximum pixel brightness value is less than or equal to a first predetermined brightness value is used as a predetermined light intensity. The plurality of analog front-end circuits are also used to receive a plurality of second images generated by the plurality of image sensors when the light source operates at the predetermined light intensity to generate a plurality of sets of second data respectively, and to receive a plurality of third images generated by the plurality of image sensors when the light source is turned off to generate a plurality of sets of third data respectively. Each pixel brightness value corresponding to each second data is less than or equal to the first predetermined brightness value. The processing circuit is also used to generate calibration information according to the sets of second data and the sets of third data.

According to one aspect of the present disclosure, a method is provided that includes: obtaining a maximum pixel brightness value of first images, the first images being generated respectively by line scan camera modules of a line scan imaging device with a light source turned on, wherein the line scan camera modules are arranged along a scan line extension direction, and the first images are stitched in the scan line extension direction; obtaining second images generated respectively by the line scan camera modules with the light source operating at a predetermined light intensity, wherein a light intensity provided by the light source when the maximum pixel brightness value is less than or equal to a first predetermined brightness value serves as the predetermined light intensity; obtaining third images generated by the line scan camera modules with the light source turned off; and generating calibration information based on the second images and the third images.

According to another aspect of the present disclosure, a line scan imaging device is provided that includes one or more processors; and a non-transitory memory storing instructions, wherein the instructions, when executed by the one or more processors, cause the one or more processors to perform: obtaining a maximum pixel brightness value of first images, the first images being generated respectively by line scan camera modules of the line scan imaging device with a light source turned on, wherein the line scan camera modules are arranged along a scan line extension direction, and the first images are stitched in the scan line extension direction; obtaining second images generated respectively by the line scan camera modules with the light source operating at a predetermined light intensity, wherein a light intensity provided by the light source when the maximum pixel brightness value is less than or equal to a first predetermined brightness value serves as the predetermined light intensity; obtaining third images generated by the line scan camera modules with the light source turned off; and generating calibration information based on the second images and the third images.

According to another aspect of the present disclosure, a line scan imaging device is provided that includes: line scan camera modules, each of which comprises a lens and an image sensor, wherein lenses of the line scan camera modules are arranged along a direction of a scan line of the line scan imaging device, image sensors of the line scan camera modules are configured to generate respectively first images with a light source turned on, and the first images are stitched along the direction of the scan line; and a control board, configured to control operations of the image sensors. The control board comprises: analog front-end circuits respectively coupled to the image sensors, and configured to receive the first images to generate sets of first data respectively; and a processing circuit coupled to the analog front-end circuits, and configured to obtain a maximum pixel brightness value of the first images utilizing the sets of first data, wherein a light intensity provided by the light source when the maximum pixel brightness value is less than or equal to a first predetermined brightness value is determined as a predetermined light intensity. The analog front-end circuits are further configured to: receive second images generated respectively by the image sensors with the light source operating at the predetermined light intensity, to generate sets of second data of the second images, and receive third images generated respectively by the image sensors with the light source turned off, to generate sets of third data of the third images. The processing circuit is further configured to generate calibration information based on the sets of second data and the sets of third data.

The line scan imaging scheme disclosed in the present application can unitedly calculate data of each line scan camera module of a multi-lens camera module to calibrate multiple line scan camera modules at the same time, thereby reducing/avoiding overexposure, improving the accuracy of calibration, and shortening the time required for the calibration process. In addition, the line scan imaging solution disclosed in the present application can significantly reduce, through digital data transmission, the calibration difference caused by long-distance transmission interference of analog signals, further improving the accuracy of image calibration.

BRIEF DESCRIPTION OF THE DRAWINGS

The various aspects and advantages of the present application can be clearly understood by reading the following embodiments in conjunction with the accompanying drawings. It should be noted that the various features in the drawings are not necessarily drawn to scale. In fact, in order to be able to describe clearly, the sizes of certain features can be enlarged or reduced at will.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
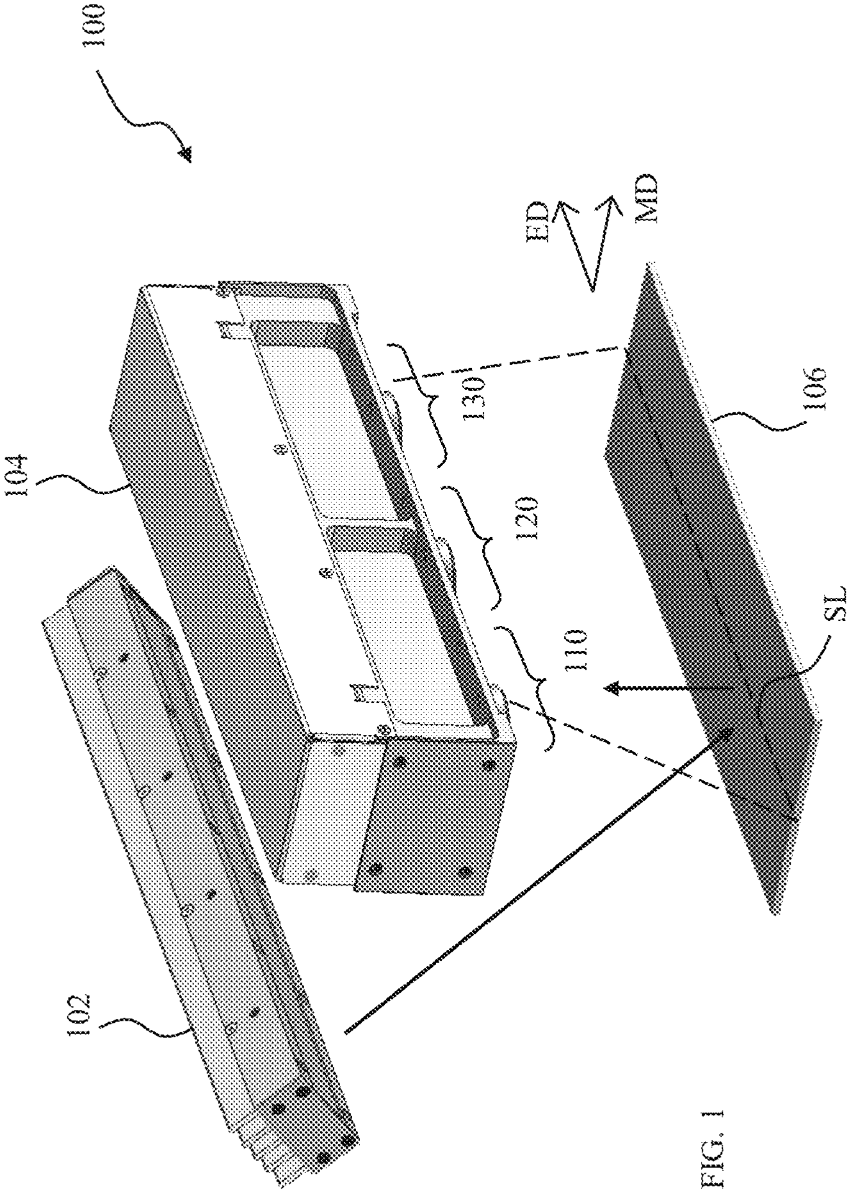
FIG. 1 is a schematic diagram of an example line scan imaging system according to embodiments of the present application.

The following disclosure discloses a variety of implementations or illustrations that can be used to implement different features of the present application. The specific examples of components and configurations described below are used to simplify the present application. As can be imagined, these descriptions are only examples and are not intended to limit the present application. For example, the present application may reuse component symbols and/or labels in embodiments. This repetition is based on the purpose of simplicity and clarity, and does not itself represent the relationship between different embodiments and/or configurations discussed.

It should be appreciated that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. Furthermore, one or more features from one or more of the following described embodiments may be combined to create alternative embodiments not explicitly described, and features suitable for such combinations are understood to be within the scope of this disclosure. It is therefore intended that the appended claims encompass any such modifications or embodiments.

In addition, if one component is described as being "connected to" or "coupled to" another component, the two components may be directly connected or coupled, or other intervening components may be present between the two components.

A multi-lens line scan camera module used for industrial inspection can increase the visual range by combining multiple cameras. The cameras may include sensors (or sensor chips) for capturing images, and may be referred to as image sensors. However, the sensor chips of these cameras may come from different wafers and have different analog signal gains, resulting in differences in brightness between images collected by these cameras, and thus forming obvious bright and dark band images. This phenomenon leads to poor consistency of visual images, causing the software to misjudge during recognition processing.

In order to reduce the image banding difference, one approach is to use adjacent chips from the same wafer to assemble a multi-lens line scan camera module. The characteristics of adjacent chips (for example, the analog signal gain characteristics) are usually similar, which can reduce the image banding difference. However, since it is not easy to control the chip manufacturing yield, the banding difference (the difference in image brightness) between different chip batches may still be quite obvious. For example, in a 256-level grayscale image, the banding difference between different chip batches may exceed 30 levels (in a 256-level grayscale). Another approach to reduce the image banding difference is to select multiple chips that are not from the same wafer but meet predetermined design requirements to form a multi-lens line scan camera module. However, this will significantly increase production cost and reduce product competitiveness.

Embodiments of the present disclosure provide exemplary calibration methods for a line scan imaging device, where the line scan imaging device includes a plurality of line scan camera modules arranged along an extension direction of a scan row or scan line of the line scan imaging device. The exemplary calibration methods detect the maximum pixel brightness value of the plurality of line scan camera modules when a light source is enabled, and calibrate the plurality of line scan camera modules simultaneously, such that images captured respectively by the plurality of line scan camera modules are consistent. For example, the light source operates at a predetermined light intensity when the maximum pixel brightness value is equal to a predetermined pixel brightness value. An exemplary calibration method may calibrate the brightness levels of the plurality of line scan camera modules simultaneously when the light source operates at the predetermined light intensity. In some embodiments, the plurality of line scan camera modules are used to capture a plurality of images stitched in the extension direction of the scan row, where the gray level difference at the junction of two adjacent images can be less than (but not limited to) 5 or much less than 30. Further, embodiments of the present application provide a plurality of exemplary control boards for line scan imaging devices. The exemplary control boards can be used to implement the calibration methods disclosed in the present application.

Embodiments of the present application also discloses a variety of exemplary line scan imaging devices, each of which includes a plurality of line scan camera modules arranged along the extension direction of the scan line, and each line scan camera module includes a lens and a corresponding image sensor. An exemplary line scan imaging device also includes a control board for performing image processing according to data output by the image sensor to calibrate the plurality of line scan camera modules at the same time. In some embodiments, the control board may be located at the sensor chip (image sensor) end and include an analog front end (AFE) circuit/chip, which can transmit data to a processing circuit in a digital manner, greatly reducing the calibration difference caused by the long-distance transmission interference of analog signals. By use of the line scan imaging schemes disclosed in the present application, even if the analog signal gains of the sensor chips are different, images collected by the sensor chips can still maintain good consistency. Further description is provided as follows.

FIG. 1 is a schematic diagram of an example line scan imaging system 100 according to embodiments of the present application. The line scan imaging system 100 includes a light source 102 and a line scan imaging device 104. When the light source 102 is incident on an object 106, the line scan imaging device 104 is used to capture reflected light reflected from the object 106 and to image the object 106 in a line-by-line scanning manner. In this embodiment, the object 106 is movable along a direction MD (perpendicular to an extension direction ED of a scan line SL of the line scan imaging device 104), such that the line scan imaging device 104 can capture a complete image of the surface of the object 106. As an example, the object 106 may be a silicon wafer, a printed circuit board or other object to be inspected, and is placed on a production line. As another example, the object 106 may be a part of a conveyor belt on a production line. As yet another example, the object 106 may be a standard white board, white paper or gray card used for white balance adjustment/brightness calibration. In some embodiments, the line scan imaging device 104 may also be movable along the direction MD when the object 106 does not move, such that the line scan imaging device 104 can capture a complete image of the surface of the object 106.

The line scan imaging device 104 may be implemented as a multi-lens line scan camera device and include a plurality of line scan camera modules 110, 120 and 130. The line scan camera modules 110, 120 and 130 may be line scan cameras. The line scan camera modules 110, 120 and 130 are arranged along the extension direction of the scan line (i.e., the extension direction ED of the scan line SL), and configured to collect/capture a plurality of images which are stitched in the extension direction of the scan line. This increases the range of view of the line scan imaging device 104. The extension direction ED of the scan line SL may be parallel to the extension direction of a line of sensor pixels (not shown in FIG. 1) in each line scan camera module. Please note that the number of line scan camera modules shown in FIG. 1 is for illustrative purposes only and is not intended to be a limitation of the present application. Those in the art should understand that the line scan imaging device 104 can be formed by combining two or more line scan camera modules without departing from the scope of the present application.

In some embodiments, by calibrating together the line scan camera modules 110-130 of the line scan imaging device 104, the consistency of images captured respectively by the line scan camera modules 110-130 can be improved. For example, if the line scan imaging device first performs image calibration on the multiple line scan camera modules one by one, and then stitches the images captured by the line scan camera modules together, the resulting stitched image is likely to have an obvious banding gaps. That is, if the multiple line scan camera modules are calibrated separately and then used to capture respective images, and the respective images are then stitched together along the direction of the scan line SL to generate a stitched image, the stitched image may show banding. In contrast, in some embodiments, the line scan imaging device 104 may first obtain multiple images generated by the line scan camera modules 110-130 respectively, and then perform brightness calibration on these images (each of which can be regarded as a single image captured by a single line scan camera module). This can greatly reduce/eliminate image differences between adjacent line scan camera modules, and also effectively simplify the calibration process, thereby reducing production cost.

Figure 2:
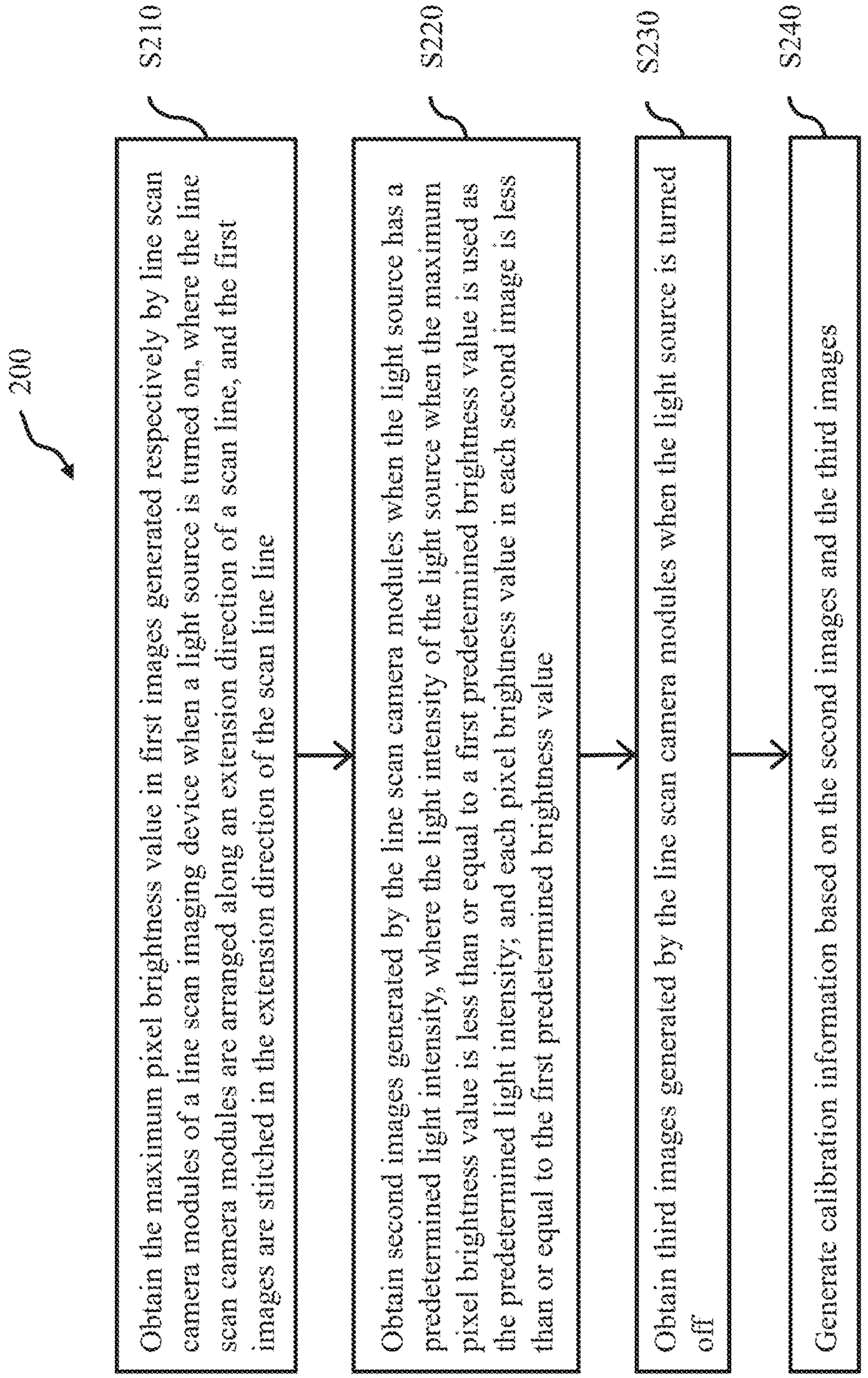
FIG. 2 is a flowchart of an exemplary calibration method for a line scan imaging device according to embodiments of the present application.

FIG. 2 is a flowchart of an exemplary calibration method for calibrating a line scan imaging device according to embodiments of the present application. For ease of explanation, the calibration method 200 is described below in conjunction with the line scan imaging device 104 shown in FIG. 1. Those in the art should understand that the calibration method 200 can be applied to other multi-lens line scan camera modules without departing from the scope of the present application. In addition, in certain embodiments, the calibration method 200 may include other steps. In certain embodiments, the steps of the calibration method 200 may be implemented in different orders or implementation manners.

Referring to FIG. 2 together with FIG. 1, in step S210, the maximum pixel brightness value is obtained in a plurality of first images generated respectively by the line scan camera modules 110-130 of the line scan imaging device 104 when the light source 102 is turned on, where the line scan camera modules 110-130 are arranged along the extension direction of the scan line (i.e., the extension direction ED of the scan line SL), and the plurality of first images are stitched in the extension direction of the scan line.

For example (but the present application is not limited thereto), the line scan camera modules 110-130 can capture the reflected light from the object 106 under the same light source condition, and generate a plurality of first images, respectively. The line scan imaging device 104 may obtain the plurality of first images captured respectively by the line scan camera modules 110-130, and determine the maximum pixel brightness value in the plurality of first images according to the data of the plurality of first images. In some embodiments, each first image may be represented as an 8-bit image, and the corresponding pixel brightness values may range from 0 to 255. In some embodiments, the object 106 may be a standard white board or white paper used for white balance adjustment. As an example, the light source is turned on, each of the line scan camera modules 110-130 may capture an image (a first image) of the object 106. These first images are stitched along the direction of the scan line to result in a stitched first image. The stitched first image includes pixels having respective brightness values, from which the maximum pixel brightness value can be determined.

In step S220, a plurality of second images generated by the line scan camera modules 110-130 when the light source 102 operates at a predetermined light intensity are obtained. The predetermined light intensity can be set/determined according to the maximum pixel brightness value obtained by the line scan imaging device 104 in step S210. For example, the light intensity provided by the light source 102 when the maximum pixel brightness value is less than or equal to a first predetermined brightness value can be used as the predetermined light intensity. Since the line scan imaging device 104 obtains a second image of each line scan camera module when the light source 102 operates at the predetermined light intensity, each pixel brightness value in each second image is less than or equal to the first predetermined brightness value. It is worth noting that the second images may be referred to as light-on images. By setting the light intensity of the light source 102 to the predetermined light intensity to obtain the light-on images, overexposure can be reduced/avoided.

As an example, the light source 102 may be set to have a first light intensity, at which, the line scan imaging device 104 may be configured to obtain a stitched first image as described with respect to step S210 above. When the maximum pixel brightness value of the stitched first image is less than or equal to the first predetermined brightness value, the first light intensity at which the stitched first image is obtained is used as the predetermined light intensity of the light source 102. The light source 104 is set with the predetermined light intensity, and the line scan imaging device 104 is operated to obtain the second images (captured by the line scan camera modules 110-130). Otherwise, when the maximum pixel brightness value of the stitched first image is greater than the first predetermined brightness value, the light source 102 may be set to have another light intensity, e.g., a second light intensity (different from the first light intensity), at which, the line scan imaging device 104 may be configured to obtain another stitched first image. The maximum pixel brightness value of the another stitched first image is then determined and compared with the first predetermined brightness value to determine whether the second light intensity may be used as the redetermined light intensity of the light source 102.

In this embodiment, the first predetermined brightness value may be determined according to the maximum grayscale value in a grayscale value range corresponding to the bit depth of each line scan camera module (i.e., the upper boundary value of the value range of the pixel brightness values). For example, the first predetermined brightness value may be set to be less than the maximum grayscale value in the grayscale value range, or set to be the maximum grayscale value minus a predetermined value. Taking the value range of the pixel brightness values being from 0 to 255 as an example, the predetermined value may be set to (but not limited to) 5, and the first predetermined brightness value may be set to 250 (i.e., maximum grayscale value 255−predetermined value 5=250). The light intensity of the light source 102 when the maximum pixel brightness value obtained in step S210 is equal to 250 may be used as the predetermined light intensity.

In step S230, a plurality of third images generated by the line scan camera modules 110-130 when the light source 102 is turned off are obtained. The third images may be referred to as light-off images. In step S240, calibration information is generated based on the plurality of second images and the plurality of third images generated by the line scan camera modules 110-130, which may be stored in the line scan imaging device 104. The calibration information may include a set of calibration data for image calibration corresponding to each line scan camera module. For example, the calibration information may include brightness calibration values corresponding to different pixels in each line scan camera module. As an example, the brightness calibration values for a line scan camera module may be used to calibrate brightness of pixels in light-on images captured by the line scan camera modules.

In some embodiments, the calibration information includes a brightness calibration value for flat field correction. For example (but the present application is not limited thereto), the line scan imaging device 104 may perform flat field correction based on the plurality of second images and the plurality of third images of the line scan camera modules 110-130. The plurality of second images and the plurality of third images may be used in calculation for photo response non-uniformity (PRNU) calibration, and the plurality of third images may be used in calculation for dark signal non-uniformity (DSNU) calibration.

By taking the maximum pixel brightness value obtained by multiple line scan camera modules (which is less than the maximum grayscale value in the grayscale value range corresponding to the pixel bit depth) as a reference, the line scan imaging scheme disclosed in this application can calculate the white balance data information of each pixel in multiple line scan camera modules, thereby simultaneously performing brightness level calibration on the multiple line scan camera modules. The line scan imaging scheme disclosed in this application can also extend the pixel brightness values to the grayscale value range corresponding to a pixel bit depth to achieve white balance between different lenses. Through the line scan imaging scheme disclosed in this application, good consistency may be achieved between respective images collected by the multiple line scan camera modules.

Figure 3A:
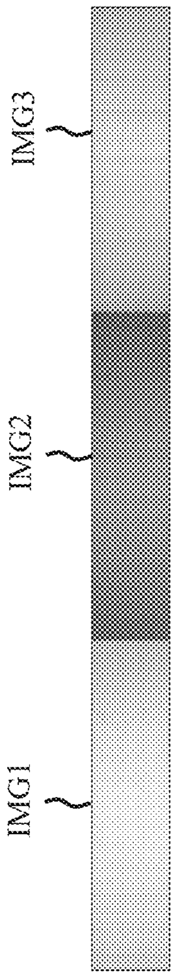
FIG. 3A and FIG. 3B are schematic diagrams of images and pixel brightness values of a line scan camera module shown in FIG. 1 before and after image calibration is performed according to embodiments of the present application.
Figure 3B:
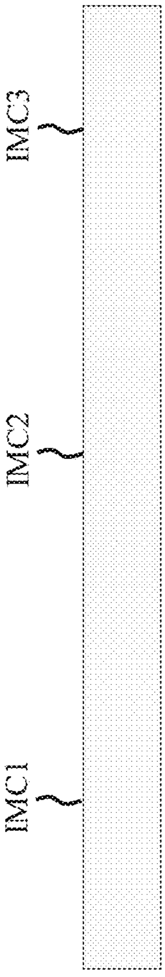

For example, referring to FIG. 3A and FIG. 3B, which are schematic diagrams showing images and pixel brightness values of the line scan camera modules 110-130 shown in FIG. 1 before and after image calibration is performed according to embodiments of the present application. FIG. 3A and FIG. 3B each includes a table showing the minimum (min.) grayscale value, the maximum (max.) grayscale value, the average (ave.) grayscale value and the standard deviation of respective images generated/captured/collected by the line scan camera modules 110-130. In these examples, each of the line scan camera modules 110-130 generates an image, and the generated images are stitched in the direction of the scan line in an order at which the line scan camera modules 110-130 are arranged. Before image calibration is performed, images generated by the line scan camera modules 110-130 are named as IMG1, IMG2 and IMG3, respectively, and after image calibration is performed, they are named as IMC1, IMC2 and IMC3. In the example of FIG. 3A, before image calibration is performed, the images IMG1, IMG2 and IMG3 (e.g., 8-bit images) collected respectively by the line scan camera modules 110, 120 and 130 may be bright field images corresponding to a white board used for white balance adjustment. The grayscale value standard deviations of the images IMG1-IMG3 are all greater than 10, and the grayscale value difference at the junction of two adjacent images is large, forming an image (the stitched image) with obvious bright and dark banding. After image calibration is performed, as shown in FIG. 3B, the grayscale value standard deviations of the images IMC1, IMC2 and IMC3 (i.e., the respective calibrated images of the images IMG1, IMG2 and IMG3) are all less than 3, and the maximum pixel brightness values (i.e., the maximum grayscale values) of the images IMC1-IMC3 can be adjusted to 255, showing good image consistency.

Figure 4A:
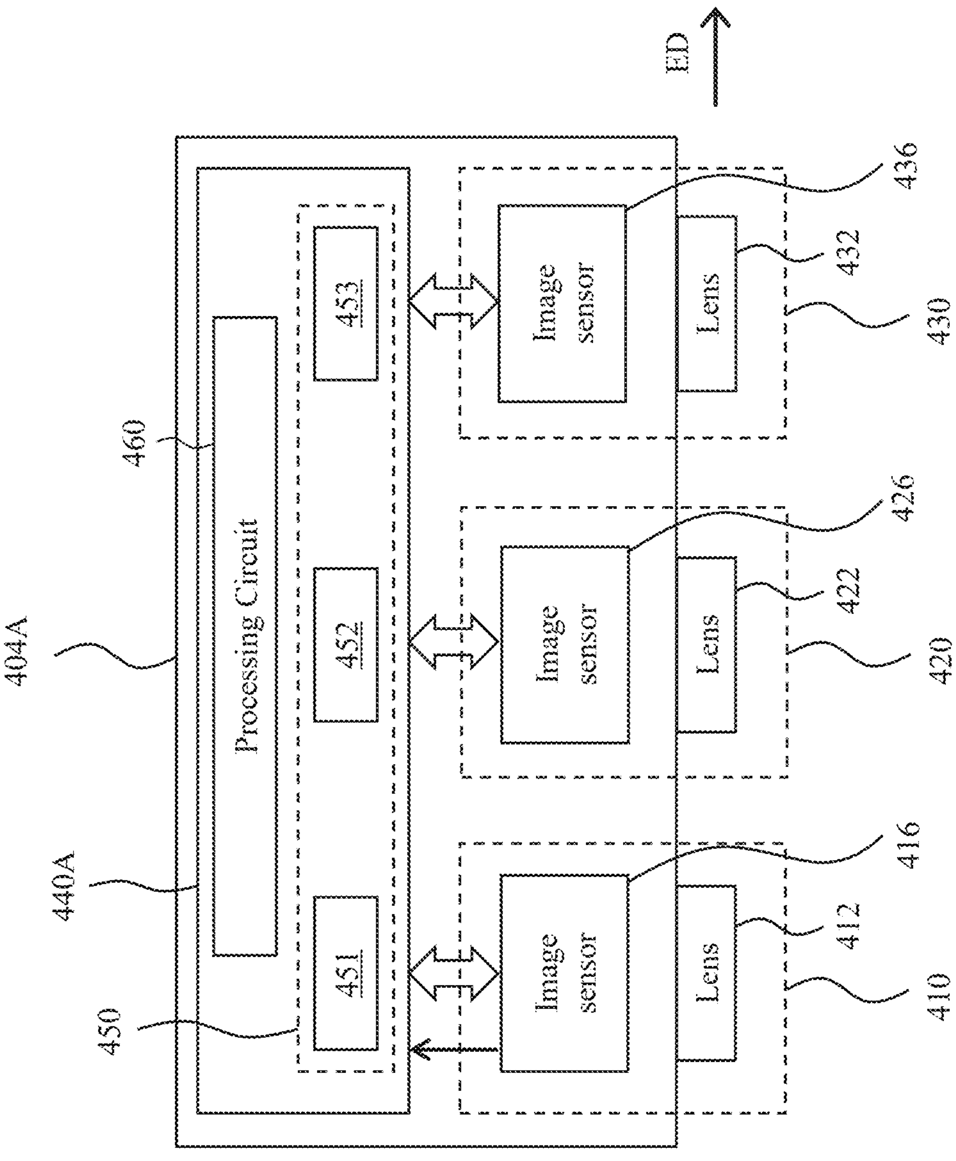
FIG. 4A is a schematic diagram of an example implementation of the line scan imaging device shown in FIG. 1 according to embodiments of the present application.

In addition, the line scan imaging scheme disclosed in the present application can significantly reduce, by use of digital data transmission, calibration differences caused by long-distance transmission interference of analog signals, and further improve the accuracy of image calibration. FIG. 4A is a schematic diagram of an example implementation of the line scan imaging device 104 shown in FIG. 1 according to embodiments of the present application. In FIG. 4A, the line scan imaging device is re-labeled as 404A for illustration convenience. The line scan imaging device 404A may include (but is not limited to) multiple line scan camera modules 410, 420, 430 and a control board 440A. The line scan camera modules 410-430 may be respectively used as embodiments of the line scan camera modules 110-130 shown in FIG. 1. The line scan camera modules 410-430 are configured to collect/capture images which are stitched in the extension direction ED shown in FIG. 1. In this embodiment, each line scan camera module may include a lens (i.e., one of the multiple lenses 412, 422 and 432) and a corresponding image sensor (i.e., one of the multiple image sensors 416, 426 and 436). The multiple lenses 412-432 are arranged along the extension direction ED shown in FIG. 1. The extension direction of a sensing pixel line (not shown in FIG. 4A) in the image sensor 416/426/436 may be parallel to the extension direction ED (i.e., the scan line extension direction). Each image sensor is configured to capture an image through its corresponding lens. In one embodiments, the line scan camera modules 410-430 may be cameras as conventionally used in the art.

The control board 440A is coupled to the image sensors 416-436 to control the operation of the image sensors 416-436. For example, the control board 440A may be used to set sensor parameters, control the operation timing of the image sensors 416-436, and process images output by the image sensors 416-436. In addition, the control board 440A may process images output by the image sensors 416-436 to calculate calibration information for image calibration. For example, the control board 440A may use the calibration method 200 shown in FIG. 2 to generate calibration information for image calibration. The calibration method 200 may be performed by the control board 440A.

In this embodiment, the control board 440A may be a control board located at the sensor chip end, or a control board arranged near the image sensors 416-436, so as to reduce data transmission distance from the image sensors 416-436 to the control board 440A. In addition, the control board 440A may perform analog-to-digital conversion on the images output by the image sensors 416-436, and reduce, through digital data transmission, the signal distortion caused by the long-distance transmission interference of the analog signals, thereby improving the accuracy of the calibration information.

Figure 4B:
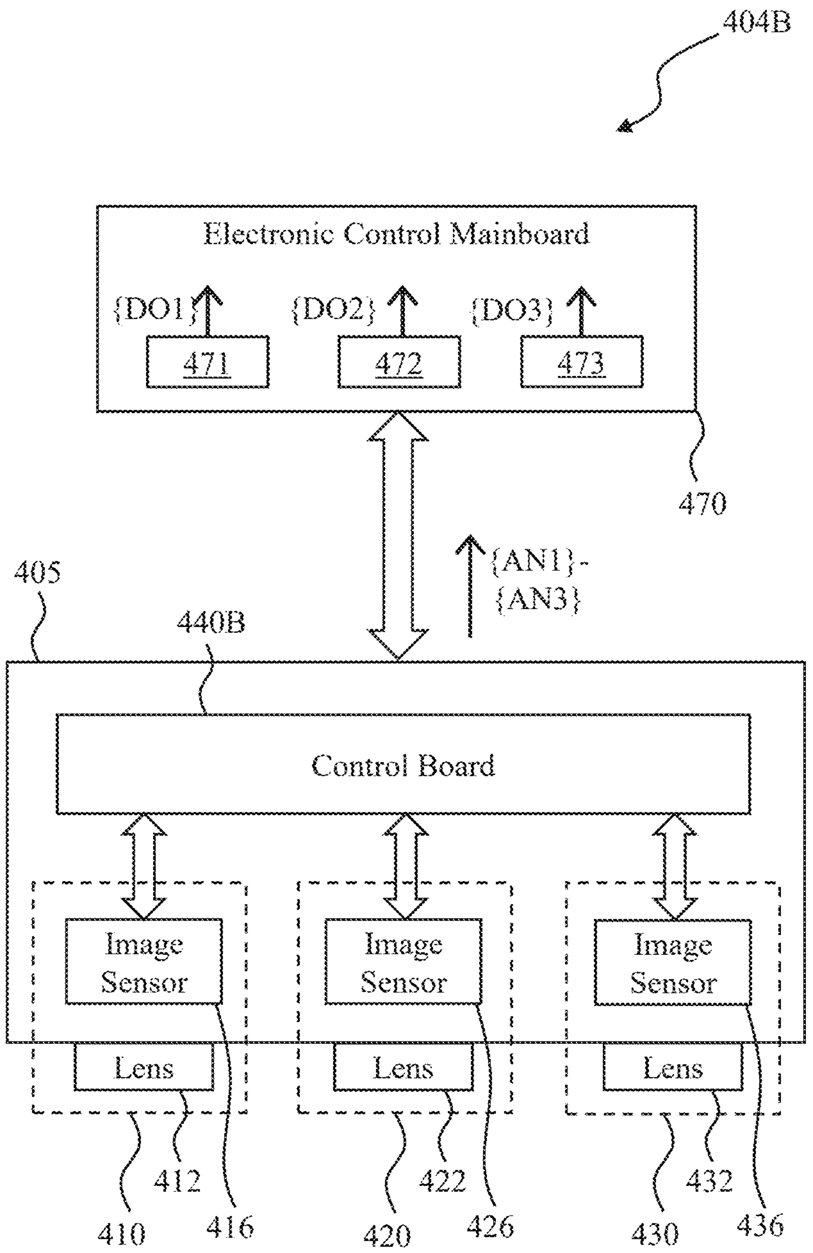
FIG. 4B is a schematic diagram of an example line scan imaging device according to embodiments of the present application.

For example, please refer to FIG. 4B, which is a schematic diagram of a line scan imaging device 404B according to embodiments of the present application. The line scan imaging device 404B includes an imaging module 405 and an electronic control mainboard 470. The imaging module 405 may include a control board 440B and the line scan camera modules 410-430 shown in FIG. 4A. The control board 440B is configured to control the operation of the respective image sensors 416-436 of the line scan camera modules 410-430, and may process images output by the image sensors 416-436 to generate respective analog outputs {AN1}, {AN2}, {AN3}({AN1}-{AN3}). The electronic control mainboard 470 is coupled to the control board 440B to manage and control the overall operation of the line scan imaging device 404B. In the embodiment shown in FIG. 4B, the electronic control mainboard 470 may convert the analog outputs {AN1}-{AN3} into digital outputs {DO1}-{DO3}, respectively, using analog-to-digital converters 471, 472, 473, and calculate calibration information for image calibration according to the digital outputs {DO1}-{DO3}. However, when the transmission line from the control board 440B to the electronic control mainboard 470 is long, the analog outputs {AN1}/{AN2}/{AN3} may easily be interfered during the transmission process, resulting in signal distortion.

In some embodiments, the line scan imaging device 404A shown in FIG. 4A may integrate the functions of an electronic control mainboard (e.g., the electronic control mainboard 470 shown in FIG. 4B) and a control board of the image sensors (e.g., the control board 440B) shown in FIG. 4B into the same control board 440A, which greatly improves the signal transmission quality. Referring back to FIG. 4A, the control board 440A may include (but not limited to) an analog front-end module 450 and a processing circuit 460. The analog front-end module 450 may include a plurality of analog front-end circuits (or analog front-end chips) 451, 452, 453. The analog front-end circuits 451-453 may respectively be coupled to the image sensors 416-436, and configured to receive respective images output by the image sensors 416-436 and generate corresponding image data accordingly. The images output by the image sensors 416-436 may be analog signals/data, and the analog front-end circuits 451-453 may perform analog-to-digital conversion on the images output by the image sensors 416-436, respectively, to generate corresponding image data (such as digital signals/data). The processing circuit 460 may be coupled to the analog front-end circuits 451-453, and configured to calculate calibration information (such as brightness correction values corresponding to different pixels) based on the image data generated by the analog front-end circuits 451-453.

In the embodiment shown in FIG. 4A, the analog front-end circuits 451-453 are integrated in the control board 440A which is configured for controlling the image sensors 416-436, the length of the signal trace between each analog front-end circuit and its corresponding image sensor is greatly shortened, thereby reducing the signal distortion caused by long-distance transmission interference of analog signals. In addition, through the analog-to-digital conversion processing of the analog front-end circuits 451-453, the signals/data in the control board 440A are transmitted in a digital manner, further improving the quality of image processing.

For ease of understanding, an exemplary control board circuit structure is provided below to illustrate an embodiment line scan imaging solution disclosed in this application. However, this is for illustrative purposes and is not intended to limit the scope of this application. Other line scan imaging devices or control boards that can use the calibration method 200 shown in FIG. 2 to achieve image calibration are also within the scope of this application.

Figure 5:
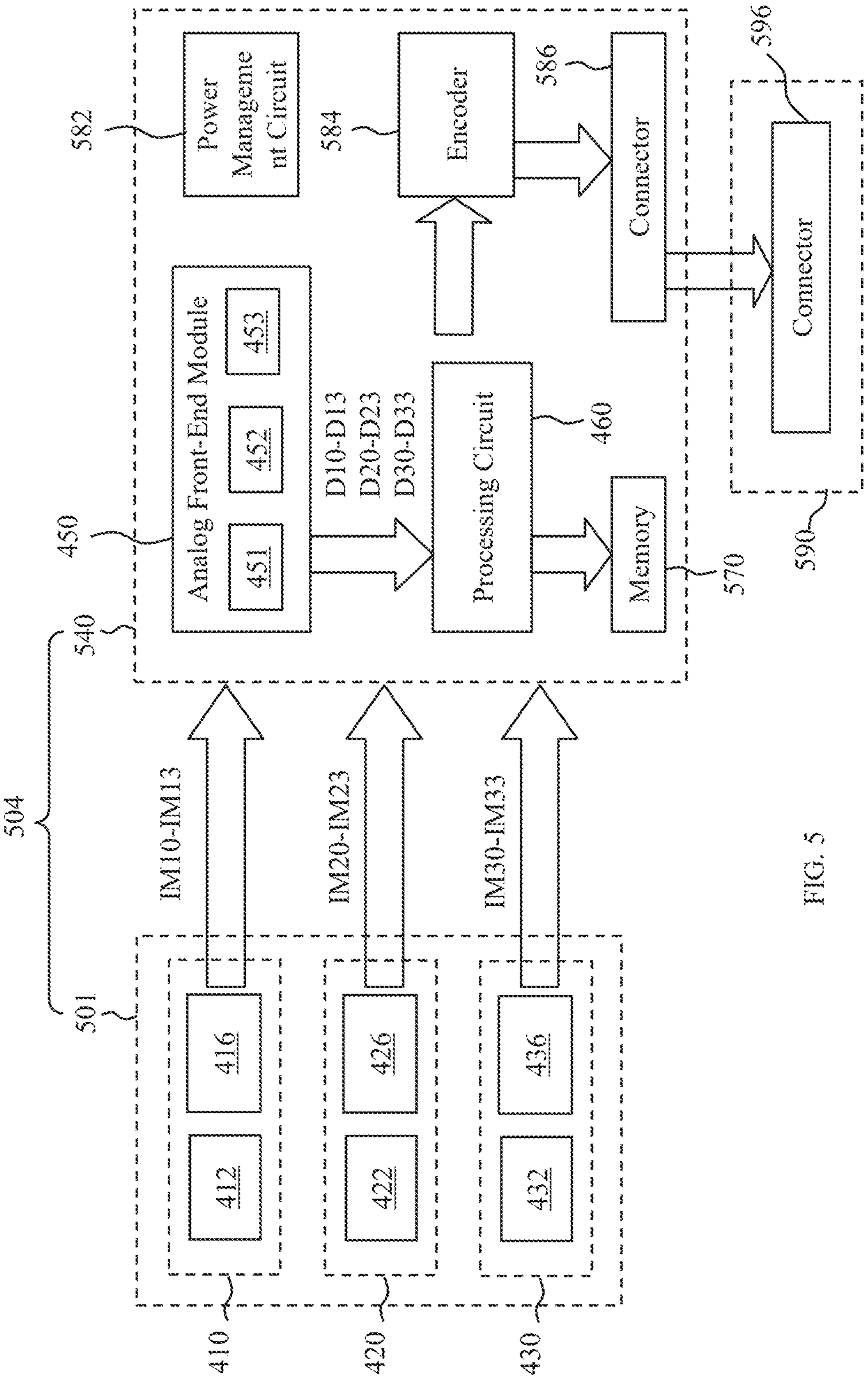
FIG. 5 is a schematic diagram of an example implementation of the line scan imaging device shown in FIG. 4A according to embodiments of the present application.

FIG. 5 is a schematic diagram of an example implementation of the line scan imaging device 404A shown in FIG. 4A according to embodiments of the present application. The line scan imaging device 404A is re-labeled as 504 in FIG. 5 for illustration convenience. The line scan imaging device 504 includes a multi-lens camera module 501 and a control board 540. The multi-lens camera module 501 may include the line scan camera modules 410-430 shown in FIG. 4A. The control board 540 may be an example implementation of the control board 440A shown in FIG. 4A. The control board 540 may calibrate the line scan camera modules 410-430 together and calculate data of each of the line scan camera modules 410-430 in a unified manner, thereby increasing the accuracy of the calibration. In this embodiment, in addition to the analog front-end module 450 and the processing circuit 460 shown in FIG. 4A, the control board 540 also includes a memory 570, a power management circuit 582, an encoder 584 and a connector 586.

The processing circuit 460 may be implemented using one or more processors, one or more application specific integrated circuits (ASICs), one or more field programmable gate arrays (FPGAs), one or more programmable logic devices (PLDs), or other types of processing circuits.

The memory 570 may include any non-transitory computer readable medium that can store data, instructions, software programs, or a combination thereof. For example, the memory 570 may be a read-only memory (ROM), a random access memory (RAM), a flash memory, an electrically erasable programmable read-only memory (EEPROM), an erasable programmable read-only memory (EPROM), a content addressable memory (CAM), a disk memory, a memory card, or other storage devices suitable for storing information. The processing circuit 460 may be configured to execute instructions and/or software programs stored in the memory 570, e.g., with use of data stored in the memory 570. In one example, the processing circuit 460 may be configured to execute instructions and/or software programs stored in the memory 570 to implement embodiment methods of the present application.

The power management circuit 582 is configured to perform power management of each element/component in the control board 540. The encoder 584 is configured to encode images captured by the multi-lens camera module 501 and convert the images into a data stream in a predetermined format. The connector 586 is configured to transmit the data stream output by the encoder 584 to a connector 596 of a user terminal 590. For example (but the present application is not limited to this), in the case where the control board 540 adopts a camera link transmission scheme to perform data transmission, the encoder 584 may be called a camera link encoder, which is configured to generate data streams in the camera link format; and the connector 586 may be called a camera link connector located at the camera end, which is connected to the connector 596 (i.e., a camera link connector located at the user terminal 590) through a camera link cable.

Figure 6:
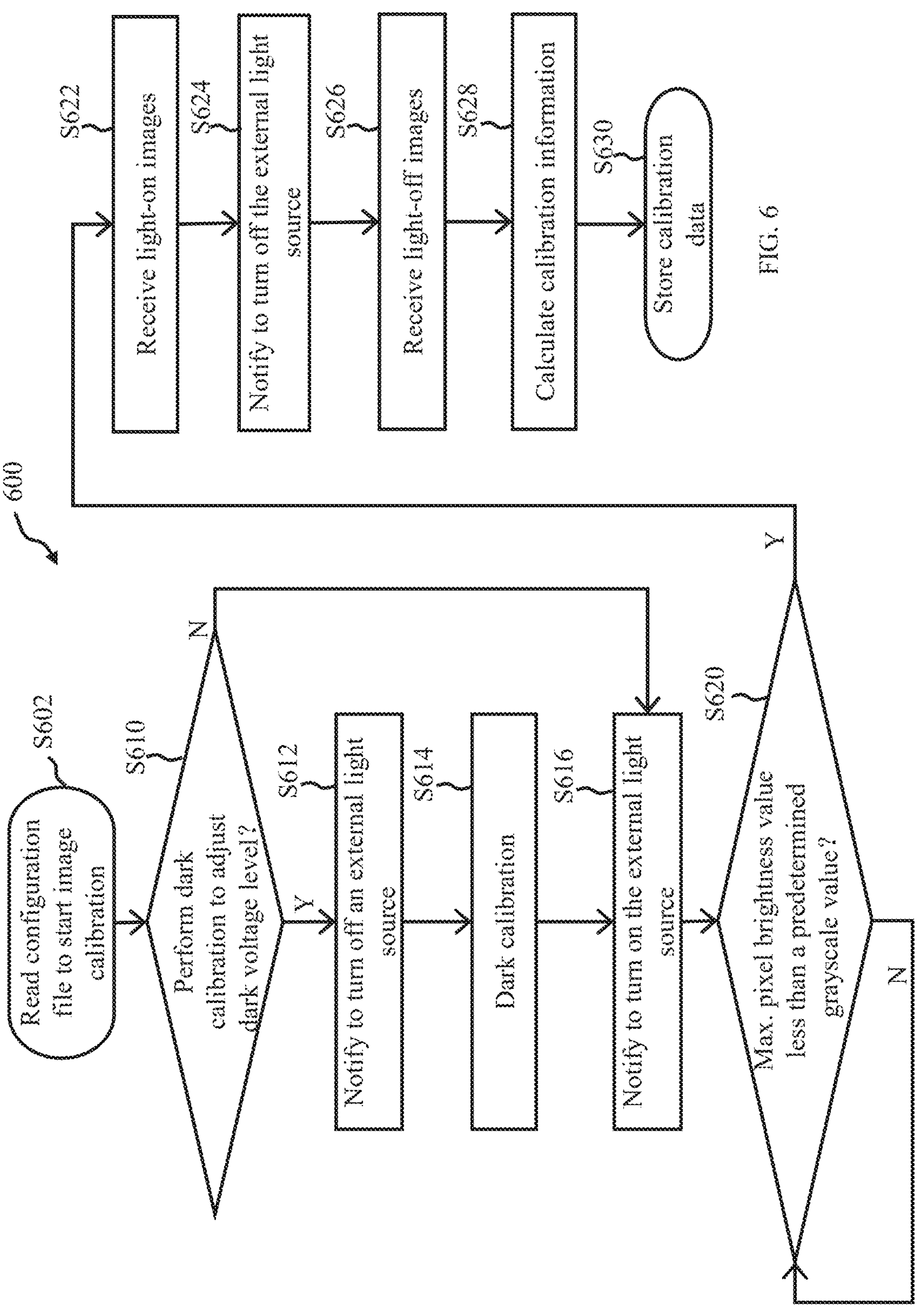
FIG. 6 is a flowchart of an exemplary calibration method for a line scan imaging device according to certain embodiments of the present application.

The operation of the line scan imaging device 504 is described below with reference to FIGS. 6 to 11. FIG. 6 is a flowchart of an exemplary calibration method 600 for a line scan imaging device according to certain embodiments of the present application. The calibration method 600 shown in FIG. 6 may be used as an example implementation of the calibration method 200 shown in FIG. 2. The calibration method 600 may be performed by the control board 540 or the line scan imaging device 504. FIG. 7 to FIG. 11 are schematic diagrams showing changes in pixel brightness values resulted from image calibration of the line scan camera modules 410-430 shown in FIG. 5 using the calibration method 600 shown in FIG. 6 according to embodiments of the present application. In the embodiments shown in FIGS. 7 to 11, the images captured by each line scan camera module may be represented as 8-bit images, and the corresponding pixel brightness values range from 0 to 255. However, the present application is not limited thereto. In certain embodiments, the line scan imaging device 504 shown in FIG. 5 may use the calibration method 200 shown in FIG. 2 to perform image calibration without departing from the scope of the present application. In certain embodiments, the line scan imaging device 504 shown in FIG. 5 may have a pixel brightness value distribution/variation different from those shown in FIGS. 7 to 11 without departing from the scope of the present application.

First, please refer to FIG. 5 and FIG. 6. In step S602, the control board 540 may read a configuration file to start image calibration. For example, the processing circuit 460 may read a configuration file related to image calibration from the memory 570, which includes various parameters for program execution A communication connection may be established between the line scan imaging device 504 and the user terminal 590.

In step S610, the control board 540 may selectively perform dark calibration (or dark/black level correction), which may adjust the dark voltage level. Dark calibration may involve adjusting a dark/black voltage level of each pixel of a camera, which is obtained when a light source is turned off, to a predetermined level. For example, when the light source is turned off, a pixel of an image sensor may produce a dark voltage or a black level, which is a baseline signal voltage. Different pixels may correspond to different black levels before the dark calibration is performed. The dark calibration adjusts a voltage level of each pixel to a predetermined value.

If it is determined to perform dark calibration, the process will execute step S612; otherwise, the process will execute step S616. As an example, the control board 540 may determine whether to perform dark calibration. When the control board 540 determines to perform dark calibration, the calibration method 600 proceeds to step S612. When the control board 540 determines not to perform dark calibration, the calibration method 600 proceeds to step S616. In some embodiments, the control board 540 (or the processing circuit 460) may selectively perform dark calibration according to instructions from the user terminal 590. In some embodiments, the control board 540 (or the processing circuit 460) may perform dark calibration at intervals. In some embodiments, the control board 540 (or the processing circuit 460) may perform dark calibration each time image calibration is started.

In step S612, the control board 540 may notify the user terminal 590 to turn off the external light source. For example, the processing circuit 460 may send a notification signal to the user terminal 590 via the encoder 584 and the connector 586. This notification signal may be used to notify the user terminal 590 to turn off the external light source, such as the light source 102 shown in FIG. 1. As an example, the user terminal 590 may control to turn off the light source 102. As another example, the user of the user terminal 590 may turn off the light source 102 in response to the notification signal received.

In step S614, the control board 540 may perform dark calibration when the external light source is turned off. In this embodiment, the processing circuit 460 may perform dark level calibration on the line scan camera modules 410-430 to adjust the dark levels of pixels of the line scan camera modules 410-430 to the same target value when the light source 102 is turned off. For example, an image IM10 (dark image) generated by the image sensor 416 when the light source 102 is turned off is converted into a set of data D10 by the analog front-end circuit 451. The processing circuit 460 may adjust the brightness value/grayscale value of each pixel in the set of data D10 (i.e., the dark level of each pixel) to the target value. Similarly, the processing circuit 460 may adjust the brightness value/grayscale value of each pixel in a set of data D20 (data of a dark image, i.e., an image IM20 output by the image sensor 426) output by the analog front-end circuit 452 to the target value, and adjust the brightness value/grayscale value of each pixel in a set of data D30 (data of a dark image, i.e., to an image IM30 output by the image sensor 436) output by the analog front-end circuit 453 to the target value.

As an example, the image sensor 416 may capture, with the light source turned off, the image IM10 through the lens 412, which is an analog image. The analog image is provided to the control board 540 and is converted into a set of digital data, i.e., the set of data D10, by the corresponding analog front-end circuit 451. The processing circuit 460 may perform dark level calibration on the set of data D10, e.g., by adjusting the brightness value/grayscale value of each pixel in the set of data D10 (i.e., the dark level of each pixel) to the target value.

Similarly, the image sensor 426 may capture, with the light source turned off, the image IM20 through the lens 422, which is an analog image. The analog image IM20 is provided to the control board 540 and is converted into a digital data, i.e., the set of data D20, by the corresponding analog front-end circuit 452. The processing circuit 460 may perform dark level calibration on the set of data D20, e.g., by adjusting the brightness value/grayscale value of each pixel in the set of data D20 (i.e., the dark level of each pixel) to the target value. Similarly, the image sensor 436 may capture, with the light source turned off, the image IM30 through the lens 432, which is an analog image. The analog image IM30 is provided to the control board 540 and is converted into a set of digital data, i.e., the set of data D30, by the corresponding analog front-end circuit 454. The processing circuit 460 may perform dark level calibration on the set of data D30, e.g., by adjusting the brightness value/grayscale value of each pixel in the set of data D30 (i.e., the dark level of each pixel) to the target value.

In some embodiments, the processing circuit 460 may perform the above-mentioned dark level calibration operations on the line scan camera modules 410-430 one by one.

Figure 7:
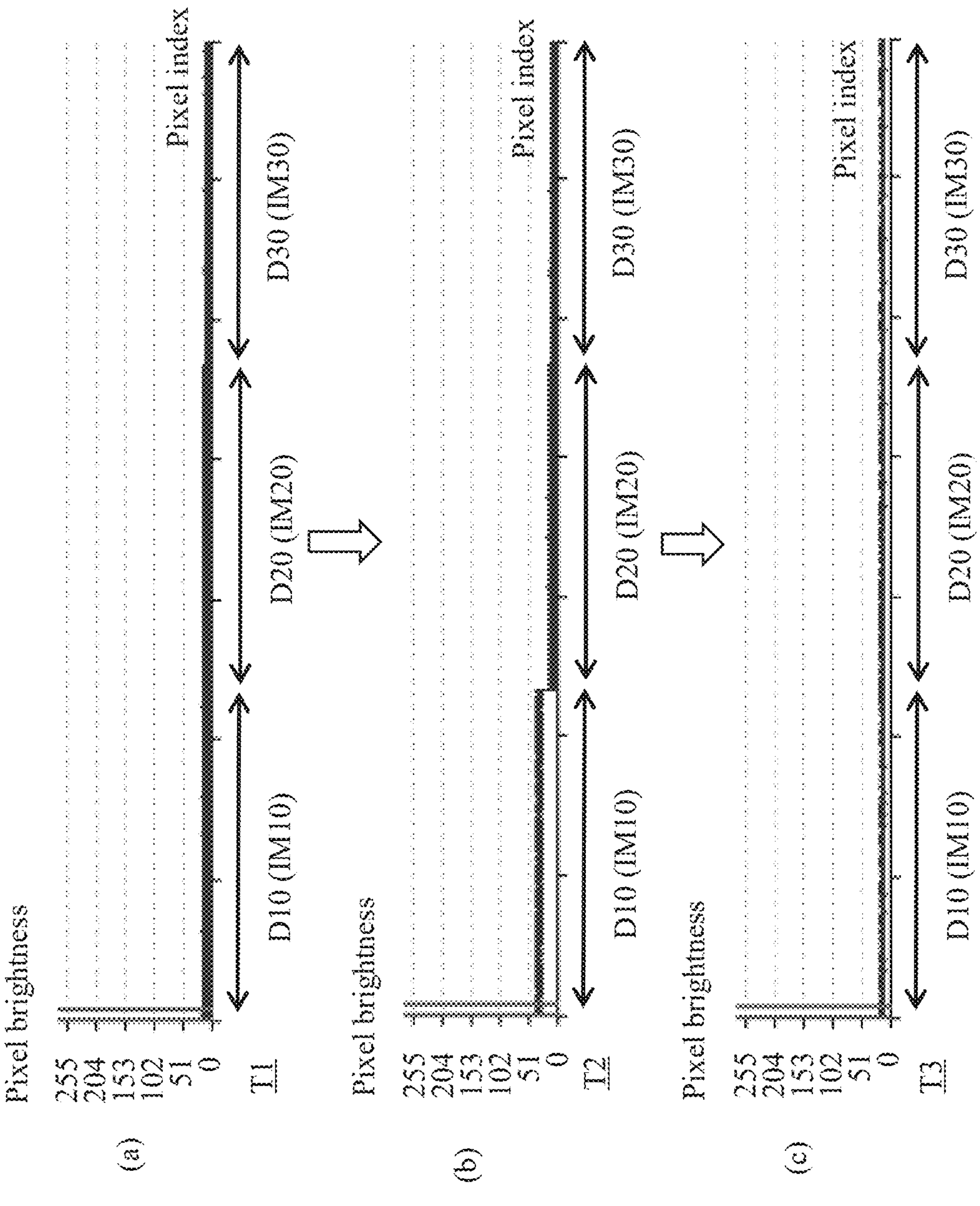
FIG. 7 is schematic diagrams of pixel brightness values corresponding to pixel indexes of a stitched image of the line scan imaging device shown in FIG. 5 before and after dark level correction is performed according to certain embodiments of the present application.

Please refer to FIG. 7, which is a schematic diagram of pixel brightness (i.e., dark levels, shown in the vertical axis, and represented by grayscale values) corresponding to pixel indexes (horizontal axis, representing pixel positions) of stitched images of the line scan imaging device 504 shown in FIG. 5 before and after dark level calibration is performed, according to embodiments of the present application. In this example, the line scan camera modules 410-430 generates/captures, along a scan line with the light source off, the images IM10, IM20 and IM30, respectively, which are converted into sets of digital data D10, D20 and D30, respectively. The images IM10, IM20 and IM30 are stitched in the direction of the scan line to result in a stitched image. The vertical axis represents pixel brightness or pixel dark levels, and the horizontal axis represents pixel indexes or pixel positions. Diagram (a) shows a stitched image without dark level calibration being performed. Diagram (b) shows a stitched image where dark level calibration is performed on the line scan camera module 410. Diagram (c) shows a stitched image where dark level calibration is performed on the line scan camera modules 410-430.

As shown, at time point T1 (diagram (a)), the processing circuit 460 has not yet performed the dark level calibration on the line scan camera modules 410-430. The dark levels of pixels in the line scan camera modules 410-430 are not the same. The processing circuit 460 may first perform the dark level calibration on the line scan camera module 410 to adjust the dark level of each pixel in the line scan camera module 410 to the same grayscale level, e.g., a grayscale value 5 (at time point T2 as shown in diagram (b)). Next, the processing circuit 460 may perform the dark level calibration on the line scan camera modules 420 and 430 in sequence, to adjust the dark level of each pixel in each of the line scan camera modules 420 and 430 to the same grayscale level, i.e., grayscale value 5 (at time point T3 as shown in diagram (c)), thereby completing the dark level calibration.

With the dark calibration performed on respective dark images captured by the line scan camera modules, brightness values of pixels in a stitched image resulting from these dark images are more consistent. The control board 540 may obtain a correction value for each pixel of an image sensor (of each line scan camera module) based on the calibrated dark images and apply the obtained correction values on subsequently captured images. As an example, the pixel brightness values in the light-off image obtained in step S626 are more consistent.

Referring back to FIG. 1, FIG. 5 and FIG. 6, in step S616, the control board 540 may notify the user terminal 590 to turn on the external light source to perform brightness calibration. For example, the processing circuit 460 may send a notification signal to the user terminal 590 via the encoder 584 and the connector 586. This notification signal may be used to notify the user terminal 590 to turn on the external light source, such as the light source 102. As an example, the user terminal 590 may control to turn on the light source 102. As another example, the user of the user terminal 590 may turn on the light source 102 in response to the notification signal received.

In step S620, the control board 540 may determine whether the maximum pixel brightness value in multiple images respectively generated by the line scan camera modules 410-430 is less than or equal to the first predetermined brightness value (i.e., the predetermined grayscale value). If it is determined that the maximum pixel brightness value is less than or equal to the first predetermined brightness value, the process will execute step S622; otherwise, the process will continue to execute step S620. In this embodiment, the image sensors 416-436 may respectively generate multiple first images IM11, IM21 and IM31 (IM11-IM31) when the light source 102 is turned on, and the analog front-end circuits 451-453 are used to respectively receive the first images IM11, IM21 and IM31 and generate sets of first data D11, D21 and D31 (corresponding to the image data of the first images IM11-IM31). In addition, the processing circuit 460 may obtain/calculate the maximum pixel brightness value in the first images IM11-IM31 according to the sets of first data D11-D31, which can be compared with the first predetermined brightness value to reduce/avoid overexposure.

As an example, the light source 102 is turned on, and the image sensors 416-436 respectively generate the first images IM11, IM21 and IM31, which are converted into the sets of digital data D11, D21 and D31 by use of the analog front-end circuits 451, 452 and 453 respectively. The first images IM11, IM21 and IM31 (i.e., the sets of data D11, D21 and D31) include pixels having pixel brightness values. The control board 540 (the processing circuit 460) may determine the maximum pixel brightness value in the pixel brightness values of the first images IM11, IM21 and IM31 using the sets of data D11, D21 and D31.

For example (but the present application is not limited thereto), the first predetermined brightness value may be set to 250 to retain a noise tolerance between the maximum value (255) of the value range of the pixel brightness values and the first predetermined brightness value. The processing circuit 460 may transmit the maximum pixel brightness value to the user terminal 590 through the encoder 584 and the connector 586, and the maximum pixel value may be displayed on the user terminal 590. When the maximum pixel brightness value is greater than the first predetermined brightness value, the user of the user terminal 590 may reduce the light intensity of the light source 102. When the maximum pixel brightness value is equal to the first predetermined brightness value, the light intensity of the light source 102 may be used as the predetermined light intensity for brightness calibration. When the maximum pixel brightness value is less than the first predetermined brightness value, and the difference between the maximum pixel brightness value and the first predetermined brightness value is acceptable, the light intensity of the light source 102 may be used as the predetermined light intensity for brightness calibration. When the maximum pixel brightness value is less than the first predetermined brightness value, and the difference between the maximum pixel brightness value and the first predetermined brightness value is too large, the user may increase the light intensity of the light source 102.

In some embodiment, the user terminal 590 may be configured to adjust the light intensity of the light source 102 based on the maximum pixel brightness value and the first predetermined brightness value without involvement of the user. For example, the light source 102 may be connected to the control board 540 wirelessly or in wire. The control board 540 may detect the maximum pixel brightness value, and based thereon, send signals to the light source 102 controlling/instructing the light source 102 to increase and decrease the light intensity. The amount of intensity to be increased or decreased may be pre-determined or adjusted by the user, and may be configurable. The control board 540 may also obtain the light intensity of the light source 102, and store in the memory 570. When determining to use the light intensity of the light source 102 as the predetermined light intensity for brightness calibration, the control board 540 may instruct the light source 102 to set the light intensity of the light source 102 to the predetermined light intensity for subsequently actions.

Next, in step S622, the control board 540 may receive light-on images generated by the multi-lens camera module 501 when the light source 102 operates at the predetermined light intensity. In the embodiment shown in FIG. 5, the image sensors 416-436 may respectively generate a plurality of second images IM12, IM22 and IM32 (IM12-IM32) when the light source 102 is turned on and has the predetermined light intensity. The analog front-end circuits 451-453 may receive the second images IM12-IM32 generated by the image sensors 416-436 when the light source 102 operates at the predetermined light intensity, and respectively generate a plurality of sets of second data D12, D22 and D32 (corresponding to image data of the second images IM12-IM32). The processing circuit 460 may form a stitched image (i.e., a light-on image) according to the sets of second data D12-D32.

Figure 8:
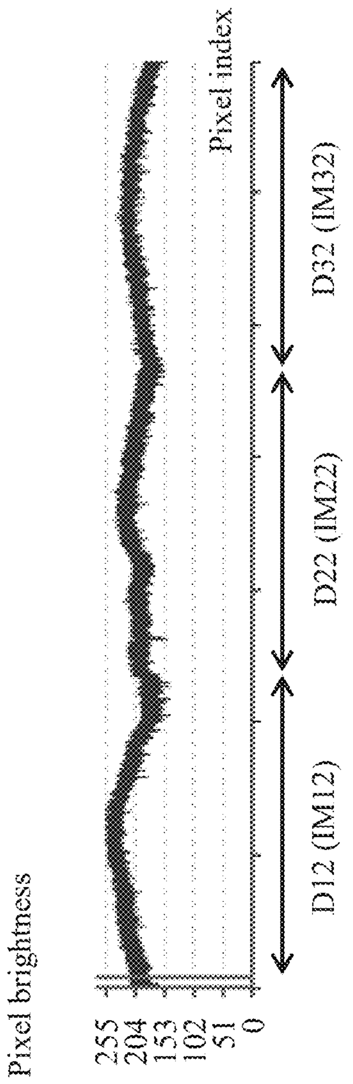
FIG. 8 is a schematic diagram of pixel brightness values corresponding to pixel indexes of a stitched image of the line scan imaging device shown in FIG. 5 when a light source operates at a predetermined light intensity according to certain embodiments of the present application.

Referring to FIG. 8 together with FIG. 5, FIG. 8 is a schematic diagram of pixel brightness values corresponding to pixel indexes of a stitched image of the line scan imaging device 504 shown in FIG. 5 according to some embodiments of the present application, where the stitched image is generated when the light source operates at the predetermined light intensity. The vertical axis represents pixel brightness, and the horizontal axis represents pixel indexes or pixel positions. The stitched image is formed by the second images IM12-IM32 stitched along a scan line. FIG. 8 shows brightness levels of pixels of the stitched image at the pixel positions (e.g., along the scan line). In this embodiment, the line scan camera modules 410-430 generate the second images IM12-IM32 when the light source (e.g., the light source 102 shown in FIG. 1) operates at the predetermined light intensity, and the maximum pixel brightness value in the second images IM12-IM32 is less than (or close to) the grayscale value 250. The second images IM12-IM32 may be referred to as original light-on images. In some embodiments, the second images IM12-IM32 may be the first images IM11-IM31 having the maximum pixel brightness value that satisfies a predetermined condition (e.g., having a maximum pixel brightness value that is less than or equal to the first predetermined brightness value). For example, the first images IM11-IM31 obtained in step S620 may be used as the second images IM12-IM32 when the maximum pixel brightness value of the first images IM11-IM31 is less than or equal to the first predetermined brightness value.

In some embodiments, the control board 540 may receive image data of multiple scan lines, and average the received image data to reduce/eliminate the influence of noise on the pixel brightness values. For example, when the light source 102 shown in FIG. 1 has the predetermined light intensity, the control board 540 may receive multiple fifth images respectively collected by the line scan camera modules 410-430, and each fifth image includes data corresponding to multiple scan lines (for example, N scan lines). The control board 540 may average the data included in the multiple fifth images according to the number of multiple scan lines (i.e., N) to generate the multiple second images IM12-IM32. In other words, for a certain pixel, the control board 540 may obtain N brightness data values of this pixel through N scans, and then use the average of the N brightness data values as the pixel brightness value of this pixel.

Referring back to FIG. 1, FIG. 5 and FIG. 6, in step S624, the control board 540 may notify the user terminal 590 to turn off the external light source, such as the light source 102. In step S626, the control board 540 may receive light-off images generated by the multi-lens camera module 501 when the light source 102 is turned off. In this case, the image sensors 416-436 as shown in FIG. 5 may respectively generate a plurality of third images IM13, IM23, and IM33 (IM13-IM33) with the light source 102 turned off. The analog front-end circuits 451-453 are configured to receive the third images IM13-IM33 generated by the image sensors 416-436 when the light source 102 is turned off, and respectively generate a plurality of sets of third data D13, D23 and D33 (corresponding to the image data of the third images IM13-IM33). The processing circuit 460 may form a stitched image (i.e., a light-off image) according to the sets of third data D13-D33.

Figure 9:
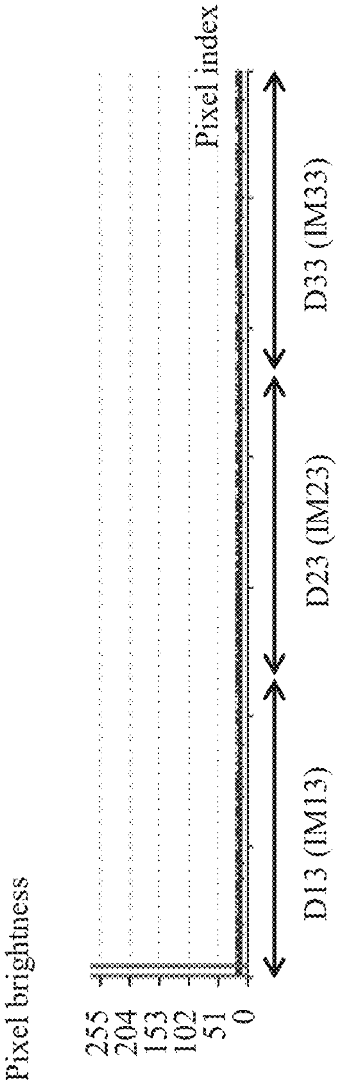
FIG. 9 is a schematic diagram of pixel brightness values corresponding to pixel indexes of a stitched image of the line scan imaging device shown in FIG. 5 when the light source is turned off according to certain embodiments of the present application.
Figure 10:
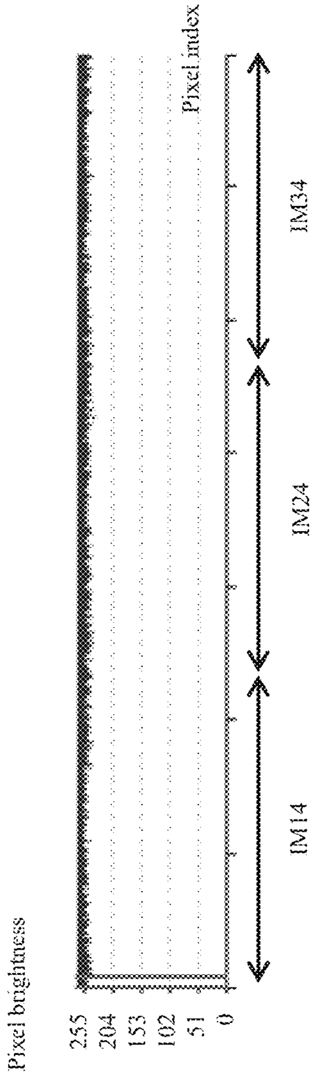
FIG. 10 is a schematic diagram of pixel brightness values corresponding to pixel indexes of a stitched image of the line scan imaging device shown in FIG. 5 after image calibration is performed according to certain embodiments of the present application.

For example, referring to FIG. 9, FIG. 9 is a schematic diagram of pixel brightness values corresponding to pixel indexes of a stitched image of the line scan imaging device 504 shown in FIG. 5 when the light source is turned off according to some embodiments of the present application. The vertical axis represents pixel brightness, and the horizontal axis represents pixel indexes or pixel positions. In the embodiment shown in FIG. 9, the stitched image is formed by the third images IM13-IM33 stitched along the scan line. The third images IM13-IM33, which are generated by the line scan camera modules 410-430 when the light source (e.g., the light source 102 shown in FIG. 1) is turned off, have pixel brightness values that are substantially equal to the same dark level target value (e.g., the target value used in step S614).

In some embodiments, the control board 540 may receive image data of multiple scan lines, and average the received image data to reduce/eliminate the effect of noise on pixel brightness values. For example, when the light source 102 shown in FIG. 1 is turned off, the control board 540 may receive multiple sixth images respectively collected by the line scan camera modules 410-430, and each sixth image includes data corresponding to multiple scan lines (e.g., N scan lines). The control board 540 may average the data included in the multiple sixth images according to the number of multiple scan lines (e.g., N) to generate the multiple third images IM13-IM33. That is, for a certain pixel, the control board 540 may obtain N brightness data values (i.e., N dark level data values) of this pixel through N scans, and then use the average of the N brightness data values as the pixel brightness value of this pixel.

Referring back to FIG. 5 and FIG. 6, in step S628, the control board 540 may perform image calibration based on the light-on images (e.g., the images IM12-IM32) and the light-off images (e.g., the images IM13-IM33) to calculate calibration information. For example, the control board 540 may deduct, from the brightness value of each pixel in the light-on images, the brightness value of the corresponding pixel in the light-off images to reduce/eliminate the influence of dark current noise on the pixel brightness value of the corresponding pixel. In addition, the control board 540 may calculate the brightness calibration information by extending the brightness value range corresponding to the obtained image data (the result of subtracting the brightness values of the light-off image data from the brightness values of the light-on image data) to a predetermined gray level value range.

In this embodiment, the control board 540 may deduct the pixel brightness values of the third images IM13/IM23/IM33 (light-off images) from the pixel brightness values of the second images IM12/IM22/IM32 (light-on images) to generate corresponding fourth images, each of which corresponds to a line scan camera module. Next, the control board 540 may calibrate a fourth image of each line scan camera module according to a second predetermined brightness value (which may be greater than the first predetermined brightness value) to generate the calibration information. Calibration on the fourth images may generate calibrated fourth images, e.g., IM14/IM24/IM34. The calibration information may include a ratio (or gain value) between a brightness value of a pixel in a calibrated image of a fourth image and a brightness value of the same pixel in the fourth image. The brightness value of the pixel in the calibrated image may be determined according to the second predetermined brightness value. In some embodiments, the second predetermined brightness value may be equal to the maximum grayscale value in a grayscale value range corresponding to a bit depth of each line scan camera module, such as 255.

That is, the processing circuit 460 may generate the calibration information according to the sets of second data D12-D32 and the sets of third data D13-D33. For example, the processing circuit 460 may deduct the pixel brightness values of the a third data (data of the light-off images) from the pixel brightness values of a corresponding second data (data of the light-on images) to generate corresponding fourth data, which includes values obtained by performing subtraction using the respective brightness values of pixels in the light-on image and the light-off image. The processing circuit 460 may calibrate the fourth data of each line scan camera module according to the second predetermined brightness value (greater than the first predetermined brightness value) to generate the calibration information.

In some embodiments, in calibrating the fourth images, the processing circuit 460 may adjust the maximum pixel brightness value in each fourth data to the second predetermined brightness value to achieve white balance between different lenses. Please refer to FIG. 10, which is a schematic diagram of pixel brightness values corresponding to pixel indexes of a stitched image of the line scan imaging device 504 shown in FIG. 5 after image calibration is performed to the fourth images according to embodiments of the present application. In the embodiment shown in FIG. 10, images IM14, IM24, IM34 respectively represent calibrated light-on images of the line scan camera modules 410-430, where the maximum pixel brightness value of each calibrated light-on image is adjusted to a grayscale value 255. The processing circuit 460 may calculate the brightness calibration information based on the brightness values in the calibrated light-on images (i.e., grayscale value 255) and the brightness values in the fourth images.

Figure 11:
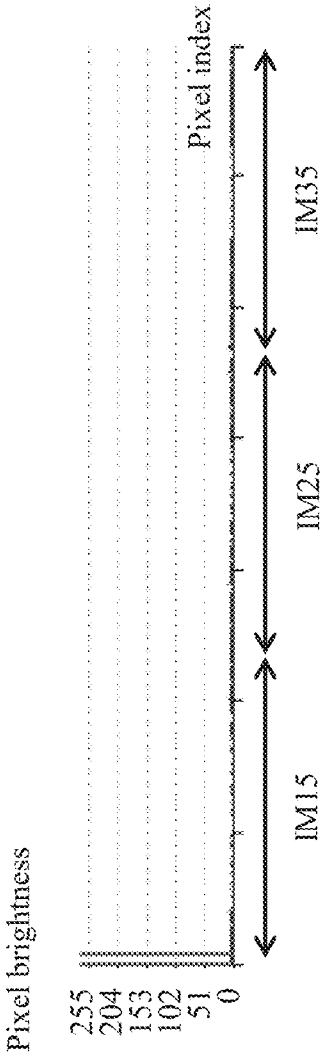
FIG. 11 is a schematic diagram of pixel brightness values corresponding to pixel indexes of a stitched image of the line scan imaging device shown in FIG. 5 after image calibration is performed according to certain embodiments of the present application.

In some embodiments, the control board 540 (or the processing circuit 460) may be configured to extend the pixel brightness values of light-off images to the grayscale value 0, as shown in FIG. 11 as an example. In the embodiment shown in FIG. 11, images IM15, IM25 and IM35 respectively represent calibrated light-off images of the line scan camera modules 410-430. The light-off images captured by the line scan camera modules 410-430 are calibrated by extending the brightness values of pixels of the light-off images to 0. In other words, the control board 540 (or the processing circuit 460) may extend the pixel brightness value range of acquired images to the gray level value range (e.g., 0 to 255) corresponding to the bit depth of each line scan camera module.

Referring back to FIG. 5 and FIG. 6, in step S630, the control board 540 may store the calibration information to complete the image calibration. For example, the processing circuit 460 may store the calibration information in the memory 570. In some embodiments, the memory 570 may store a plurality of instructions INS, where when the processing circuit 460 executes the plurality of instructions INS, the plurality of instructions INS may cause the processing circuit 460 to execute the embodiment calibration methods disclosed in the present application, such as the calibration method 600 or the calibration method 200 shown in FIG. 2.

By collecting data captured by all lenses (i.e., all line scan camera modules) when the light source is on, the calibration methods disclosed in the present application can unitedly calculate all data when performing brightness calibration, thereby reducing/avoiding overexposure, improving calibration accuracy, and shortening the time required for the calibration process.

The above description is for the purpose of illustration and is not intended to limit the scope of the present application. In some embodiments, the number of pixels and/or the pixel brightness values of the line scan camera modules shown in FIG. 7 to FIG. 11 may be adjusted according to design requirements. In some embodiments, the external light source (such as the light source 102 shown in FIG. 1) may be controlled by the control board 540 (or the processing circuit 460), that is, the control board 540 (or the processing circuit 460) may determine in step S620 whether the maximum pixel brightness value of the line scan camera modules 410-430 is less than or equal to the first predetermined brightness value, and selectively adjust the light intensity of the external light source accordingly. In some embodiments, the calibration method 600 may be applied to other line scan imaging devices with multiple lenses (such as the line scan imaging device 104 shown in FIG. 1, the line scan imaging device 404A shown in FIG. 4A, or the line scan imaging device 404B shown in FIG. 4B) without departing from the scope of the present application.

In some embodiments, the processing circuit 460 may perform brightness calibration for pixel brightness values within a certain grayscale value range (e.g., 100 to 250) according to design requirements (or user requirements). For example, the processing circuit 460 may perform brightness calibration for pixel brightness values within a certain grayscale value range in the second images IM12-IM32. In some embodiments, the calibration method 600 may include other steps. In some embodiments, the steps of the calibration method 600 may be implemented in different orders or implementation manners.

Figure 12:
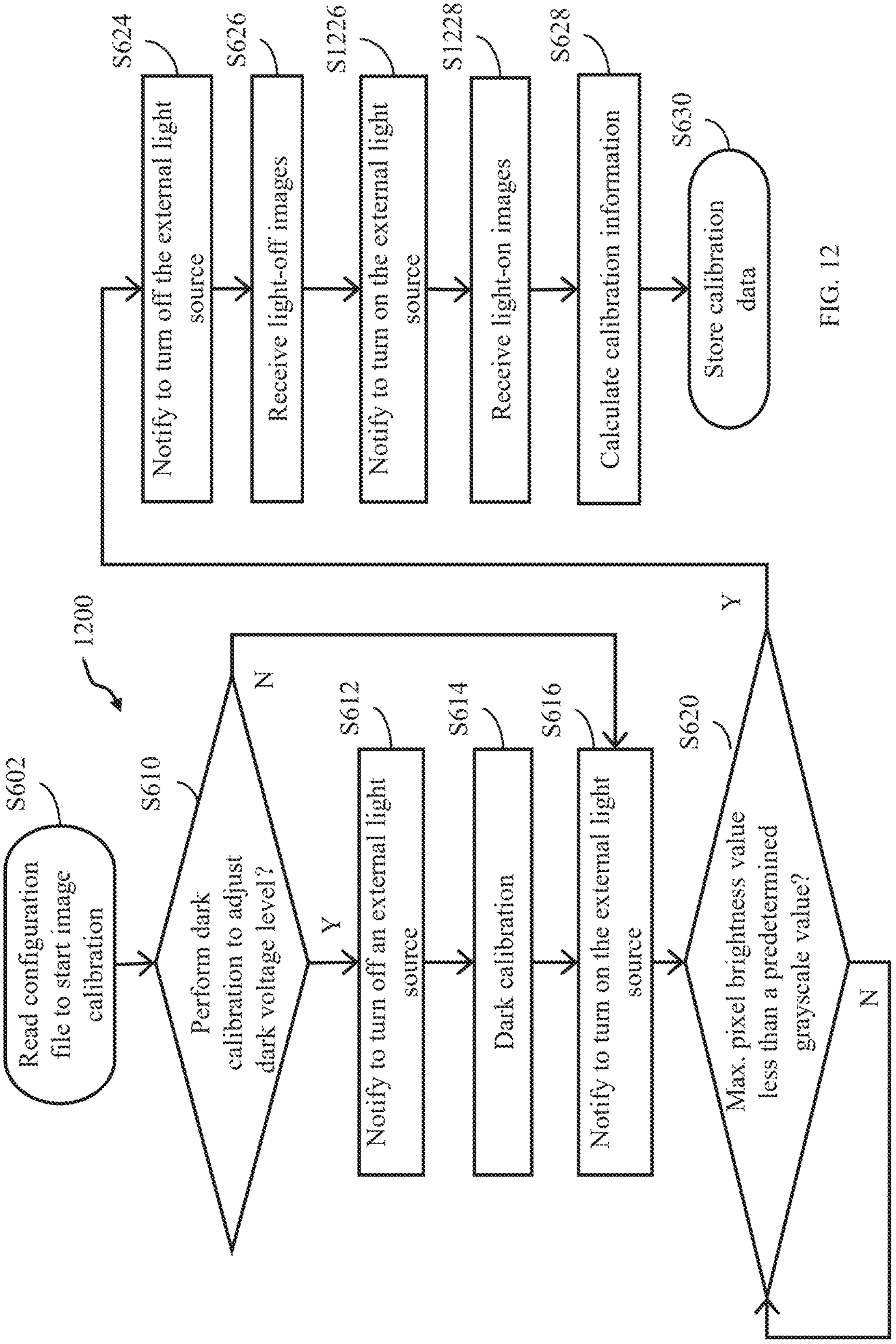
FIG. 12 is a flowchart of an exemplary calibration method for a line scan imaging device according to certain embodiments of the present application.

FIG. 12 is a flowchart of an exemplary calibration method 1200 for a line scan imaging device according to certain embodiments of the present application. The calibration method 1200 may be used as an example implementation of the calibration method 200 shown in FIG. 2. The calibration method 1200 is substantially the same as/similar to the calibration method 600 shown in FIG. 6, except that in FIG. 12, the steps of receiving the light-on images and receiving the light-off images are performed in a different order. In the embodiment shown in FIG. 12, after determining the predetermined light intensity of the external light source (such as the light source 102 shown in FIG. 1) (step S620), the calibration method 1200 first receives the light-off images (steps S624 and S626), and then receives the light-on images (steps S1226 and S1228). The step S1226 may be implemented similarly to the step S616, and the step S1228 may be implemented similarly to the step S622 shown in FIG. 6.

In some embodiments, the multiple instructions INS may cause the processing circuit 460 shown in FIG. 5 to execute the calibration method 1200. Since those skilled in the art should be able to understand the operation details of the calibration method 1200 after reading the paragraphs about FIG. 1 to FIG. 11, further description is omitted here.

The line scan imaging solutions disclosed in the present application unitedly calculates data of each line scan camera module of the multi-lens camera module to calibrate the line scan camera modules at the same time, thereby reducing/avoiding overexposure, improving the accuracy of calibration, and shortening the time required for the calibration process. In addition, the line scan imaging solutions disclosed in the present application can significantly reduce, through digital data transmission, the calibration difference caused by long-distance transmission interference of analog signals, further improving the accuracy of image calibration.

The above description briefly presents the features of certain embodiments of the present application, so that those skilled in the art can fully understand the various aspects of the present application. Those skilled in the art will appreciate that they can easily use the content of the present application as a basis to design or modify other processes and structures to achieve the same purpose and/or achieve the same advantages as the embodiments described herein. Those skilled in the art should understand that these equivalent embodiments still belong to the spirit and scope of the present application, and that they can be subjected to various changes, substitutions and modifications without departing from the spirit and scope of the present application.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, which may perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed:

1. A method comprising:

obtaining a maximum pixel brightness value of first images, the first images being generated respectively by line scan camera modules of a line scan imaging device with a light source turned on, wherein the line scan camera modules are arranged along a scan line extension direction, and the first images are stitched in the scan line extension direction;

obtaining second images generated respectively by the line scan camera modules with the light source operating at a predetermined light intensity, wherein a first light intensity provided by the light source when the maximum pixel brightness value is less than or equal to a first predetermined brightness value serves as the predetermined light intensity, wherein when the maximum pixel brightness value is greater than the first predetermined brightness value, a second light intensity, different from the first light intensity and provided by the light source, serves as the predetermined light intensity when another maximum pixel brightness value of the first images generated at the second light intensity is less than or equal to the first predetermined brightness value;

obtaining third images generated by the line scan camera modules with the light source turned off; and generating calibration information for the line scan imaging device based on the second images and the third images.

2. The method according to claim 1, wherein the first predetermined brightness value is smaller than a maximum grayscale value in a grayscale value range corresponding to a bit depth of each line scan camera module.

3. The method according to claim 1, wherein the calibration information includes a calibration value for flat field correction.

4. The method according to claim 1, wherein generating the calibration information based on the second images and the third images comprises:

subtracting pixel brightness values of a third image from pixel brightness values of a second image of each line scan camera module to generate a corresponding fourth image of the each line scan camera module; and calibrating the corresponding fourth image of the each line scan camera module based on a second predetermined brightness value to generate the calibration information, wherein the second predetermined brightness value is greater than the first predetermined brightness value.

5. The method according to claim 4, wherein calibrating the corresponding fourth image comprises:

adjusting a maximum pixel brightness value in the corresponding fourth image to the second predetermined brightness value.

6. The method according to claim 4, wherein the second predetermined brightness value is equal to a maximum grayscale value in a grayscale value range corresponding to a bit depth of each line scan camera module.

7. The method according to claim 1, further comprising:

before obtaining the maximum pixel brightness value, performing, with the light source turned off, dark level calibration on the line scan camera modules to adjust dark levels of the line scan camera modules to a same target value.

8. The method according to claim 7, wherein the dark level calibration is performed on the line scan camera modules one by one.

9. The method according to claim 1, wherein obtaining the second images comprises:

receiving fifth images captured respectively by the line scan camera modules with the light source operating at the predetermined light intensity, wherein each fifth image includes data corresponding to scan lines; and averaging data included in the fifth images according to a number of the scan lines, to generate the second images.

10. The method according to claim 1, wherein obtaining the third images comprises:

receiving sixth images captured respectively by the line scan camera modules with the light source turned off, wherein each sixth image includes data corresponding to scan lines; and averaging data included in the sixth images according to a number of the scan lines to generate the third images.

11. A line scan imaging device, comprising:

one or more processors; and a non-transitory memory storing instructions, wherein the instructions, when executed by the one or more processors, cause the one or more processors to perform:

obtaining a maximum pixel brightness value of first images, the first images being generated respectively by line scan camera modules of the line scan imaging device with a light source turned on, wherein the line scan camera modules are arranged along a scan line extension direction, and the first images are stitched in the scan line extension direction;

obtaining second images generated respectively by the line scan camera modules with the light source operating at a predetermined light intensity, wherein a first light intensity provided by the light source when the maximum pixel brightness value is less than or equal to a first predetermined brightness value serves as the predetermined light intensity, wherein when the maximum pixel brightness value is greater than the first predetermined brightness value, a second light intensity, different from the first light intensity and provided by the light source, serves as the predetermined light intensity when another maximum pixel brightness value of the first images generated at the second light intensity is less than or equal to the first predetermined brightness value;

obtaining third images generated by the line scan camera modules with the light source turned off; and generating calibration information for the line scan imaging device based on the second images and the third images.

12. The line scan imaging device according to claim 11, wherein generating the calibration information based on the second images and the third images comprises:

subtracting pixel brightness values of a third image from pixel brightness values of a second image of each line scan camera module to generate a corresponding fourth image of the each line scan camera module; and calibrating the corresponding fourth image of the each line scan camera module based on a second predetermined brightness value to generate the calibration information, wherein the second predetermined brightness value is greater than the first predetermined brightness value.

13. The line scan imaging device according to claim 12, wherein calibrating the corresponding fourth image comprises:

adjusting a maximum pixel brightness value in the corresponding fourth image to the second predetermined brightness value.

14. The line scan imaging device according to claim 11, wherein the instructions further cause the one or more processors to perform:

before obtaining the maximum pixel brightness value, performing, with the light source turned off, dark level calibration on the line scan camera modules to adjust dark levels of the line scan camera modules to a same target value.

15. A line scan imaging device, comprising:

line scan camera modules, each of which comprises a lens and an image sensor, wherein lenses of the line scan camera modules are arranged along a direction of a scan line of the line scan imaging device, image sensors of the line scan camera modules are configured to generate respectively first images with a light source turned on, and the first images are stitched along the direction of the scan line; and a control board, configured to control operations of the image sensors, the control board comprising:

analog front-end circuits respectively coupled to the image sensors, and configured to receive the first images to generate sets of first data respectively; and a processing circuit coupled to the analog front-end circuits, and configured to obtain a maximum pixel brightness value of the first images utilizing the sets of first data, wherein a first light intensity provided by the light source when the maximum pixel brightness value is less than or equal to a first predetermined brightness value is determined as a predetermined light intensity, wherein when the maximum pixel brightness value is greater than the first predetermined brightness value, a second light intensity, different from the first light intensity and provided by the light source, serves as the predetermined light intensity when another maximum pixel brightness value of the first images generated at the second light intensity is less than or equal to the first predetermined brightness value; and wherein the analog front-end circuits are further configured to:

receive second images generated respectively by the image sensors with the light source operating at the predetermined light intensity, to generate sets of second data of the second images, and receive third images generated respectively by the image sensors with the light source turned off, to generate sets of third data of the third images; and wherein the processing circuit is further configured to generate calibration information for the line scan imaging device based on the sets of second data and the sets of third data.

16. The line scan imaging device according to claim 15, wherein the first predetermined brightness value is smaller than a maximum grayscale value in a grayscale value range corresponding to a bit depth of each line scan camera module.

17. The line scan imaging apparatus according to claim 15, wherein the calibration information includes a calibration value for flat field correction.

18. The line scan imaging device according to claim 15, wherein the processing circuit is further configured to:

subtract pixel brightness values of a set of third data from pixel brightness values of a set of second data of each line scan camera module to generate a corresponding set of fourth data of the of each line scan camera module, and calibrate the corresponding set of fourth data of the each line scan camera module based on a second predetermined brightness value to generate the calibration information, wherein the second predetermined brightness value is greater than the first predetermined brightness value.

19. The line scan imaging device according to claim 18, wherein the processing circuit is further configured to adjust a maximum pixel brightness value of the corresponding set of fourth data to the second predetermined brightness value.

20. The line scan imaging device according to claim 15, wherein the processing circuit is further configured to:

perform, before obtaining the maximum pixel brightness value and with the light source turned off, dark level calibration on the line scan camera modules to adjust dark levels of the line scan camera modules to a same target value.

* * * * *